June 3, 1958 H. BLEIBTREU 2,837,035
FREIGHT CAR TRUCK
Filed Jan. 17, 1955
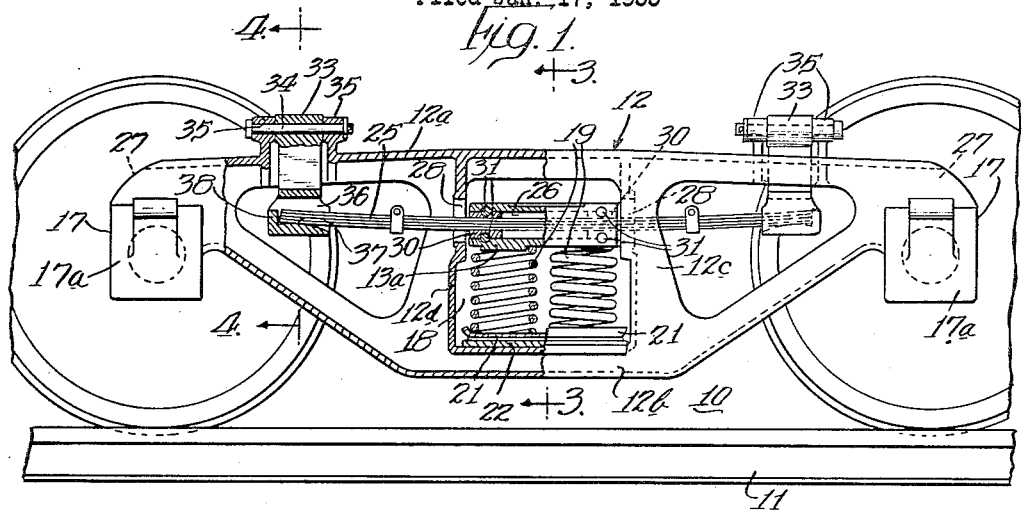
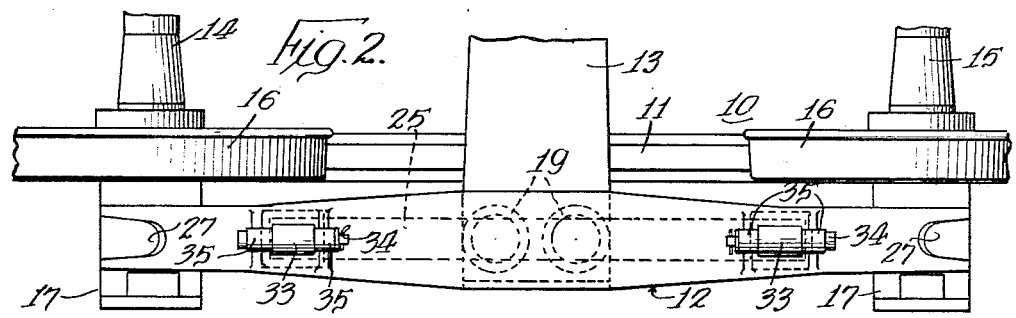
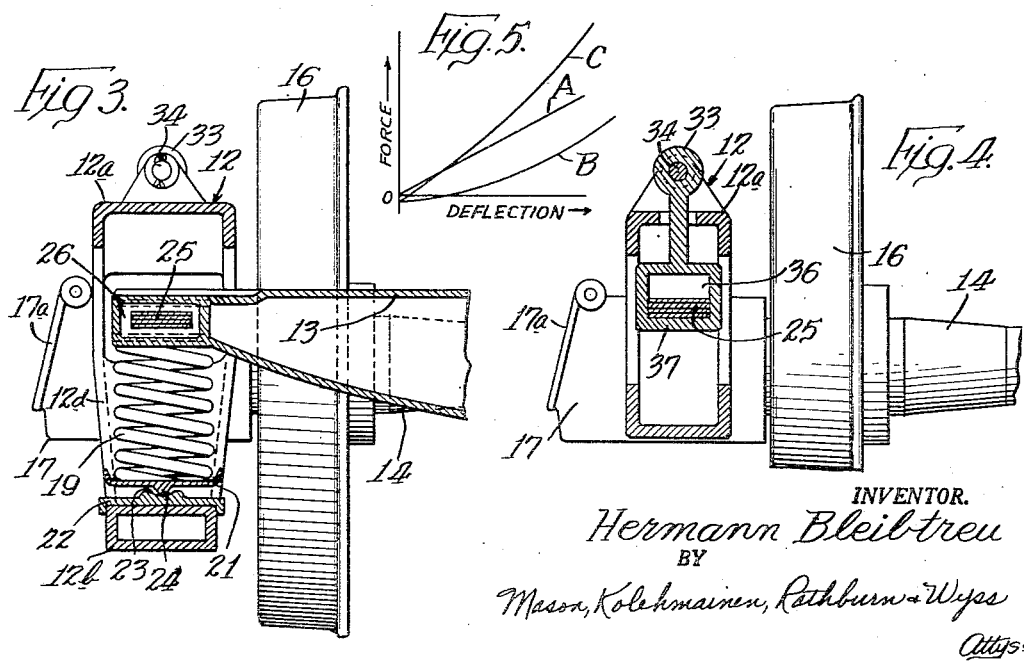
INVENTOR.
Hermann Bleibtreu
BY
Mason, Kolehmainen, Rathburn & Wyss
Attys.

United States Patent Office 2,837,035
Patented June 3, 1958

2,837,035

FREIGHT CAR TRUCK

Hermann Bleibtreu, Hinsdale, Ill.

Application January 17, 1955, Serial No. 482,105

7 Claims. (Cl. 105—197.1)

The present invention relates to freight car trucks for railway freight cars, and more specifically to a railway freight car truck of simple design and structure capable of ready substitution for existing trucks which will permit higher safe speed of operation than is permitted by trucks now in use.

Although the freight car truck described hereinafter is not limited to use on freight cars it has been designed with that use particularly in view, and, hence, the invention will be described with that use in mind, but without any implied limitation to such use. As applied to freight cars the primary utility of the present invention lies in its ability to allow freight car operation under existing limitations at substantially higher speeds than those which are presently considered safe with existing freight car truck equipment and to provide longer life of the equipment.

It will be understood by those skilled in the art that the conventional freight car truck extensively used comprises certain basic elements including two side frames, a truck bolster, spring clusters for supporting each end of the truck bolster from the adjacent side frame, and a pair of wheeled axles for the side frames, which axles are journalled at the forward and rear portions of the two side frames. Conventionally the freight car body is supported on the bolster and forces between the bolster and the car body and vice versa are transmitted through means interconnecting the bolster and the car body. The conventional car trucks also include a bolster window defined in each side frame into which the adjacent end of the bolster extends, and which is supported therein on suitable spring clusters thereby permitting relative vertical movement between the bolster and the side frame. It will be appreciated that a substantial amount of play, both longitudinal and lateral with respect to the bolster, must exist between the portion of the bolster extending into the bolster window and the vertical sides of the frame defining the bolster opening or window to permit both. This play is undesirable and yet necessary. It exists because of the inaccuracy of the non-machined bolster window and non-machined bolster. Moreover, if such play were not provided there would be the possibility of binding of the bolster within the bolster window of the side frame, when the car truck moves over a track section which has a hump in it or the like. Furthermore, the truck side frames must be capable of moving relatively to each other as the car truck moves along the track, since one track side may be higher or lower than the other, and, hence longitudinal play must be permitted between the bolster ends and the bolster windows to permit these side frames to move freely relative to each other around a horizontal lateral axis. Obviously also, binding would be caused between the bolsters and the bolster windows and the side defining the bolster windows if play were not provided because of the unevenness of the tracks which is so common.

There are, of course, on the market freight car trucks in which a rigid frame is provided, including side portions and end portions which maintain the side portions in a predetermined relationship. The type of car with which the present invention is concerned does not employ such a rigid frame and it has several advantages over the rigid frame type of trucks. First of all, the type of trucks with which the present invention is concerned is much simpler than the rigid frame type and is much more satisfactory on uneven track due to the side frames being able to move relative to each other. Heretofore, however, there have also been several disadvantages with respect to the non-rigid type of freight car truck frame as against the rigid type. These disadvantages comprise misalignment of the frame which is possible due to the shifting of the side frames relative to each other in a direction along the longitudinal axis of the track so that the axles, although still parallel to each other, are not at right angles to the tracks. This, of course, results in undue wear of the wheel rims and, furthermore, increases the friction, and, hence the force required to move the car along the track. Another disadvantage of presently constructed trucks of the non-rigid frame type with which the present invention is concerned is that both the longitudinal and lateral play between the bolster and the side frames is not damped and is restrained, but very slightly, by the resistance of the spring clusters thereby causing periodic shocking as the truck is put into motion or during a braking action. Lateral shocks, in particular, cause hard blows and possible damage to the load on the freight car. Furthermore, the conventional coil springs employed with such trucks heretofore produce a straight line spring characteristic with the resultant "hard springing," and correspondingly high natural frequencies at light loads, both of which are undesirable. Moreover, since the friction between the bolster and the side frames is small there is inadequate damping which makes the problem of high natural frequencies at light loads even worse and causes substantial wear between the bolsters and side frames.

It would be desirable to provide a freight car truck frame of the non-rigid type which overcomes the disadvantages and drawbacks above enumerated, and it is an object of the present invention to provide a new and improved truck frame of the non-rigid type which eliminates the disadvantages set forth above.

It is another object of the present invention to provide an improved freight car truck frame in which the likelihood of hard blows between the bolsters and side frames are completely eliminated.

It is another object of the present invention to provide in a freight car truck frame a construction in which spring means absorb thrusts in all directions, which spring means also provide inherent damping.

Still another object of the present invention resides in a freight truck frame which maintains the axles not only parallel, but at right angles with the track and particularly the longitudinal axis of the track.

Further objects and advantages of the present invention will become apparent as the following description proceeds, and the features of novelty which characterize the invention will be pointed out with particularity with the claims annexed to and forming a part of this specification.

For a better understanding of the present invention reference may be had to the accompanying drawing in which:

Fig. 1 is a side elevational view of a truck frame embodying the present invention with certain portions thereof cut away better to illustrate the present invention;

Fig. 2 is a top view of the truck frame of Fig. 1 showing, however, only one side of the truck frame, the other side being symmetrical in every respect;

Fig. 3 is an enlarged sectional view taken on line

3—3 of Fig. 1, assuming that Fig. 1 shows the complete structure;

Fig. 4 is an enlarged sectional view taken on line 4—4 of Fig. 1, again assuming that Fig. 1 shows the complete structure; and Fig. 5 is a curve diagram to aid in understanding the operation of the present invention.

Briefly, the present invention comprises a freight car truck of the non-rigid frame type including the provision of leaf springs in addition to the coil spring clusters and connected in such a manner with respect to the bolster and side frame to overcome the disadvantages noted above which are inherent in freight car frames of the non-rigid type. Both lateral and longitudinal forces are controlled in a very simple manner.

Referring now to the drawing, there is illustrated a truck frame generally indicated at 10 which is illustrated in Fig. 1 of the drawing as supported on a suitable railway track 11. The truck frame 10 comprises a pair of side frames 12 only one of which is shown, a bolster 13 and axles 14 and 15 having their ends journalled within suitable bearings disposed in journal boxes 17 integrally formed with the side frames 12. A pair of suitable wheels such as 16 are secured to each axle 14 and 15. In the conventional manner each side frame 12 comprises a one-piece steel casting, although obviously it could be fabricated in any other manner, and the illustrated embodiment is by way of example only. The side frame 12 is a sort of metal truss structure including a compression member 12a and a tension member 12b that converge toward the journal boxes 17 integral with the frame 12 at the ends of the frame. The front of each journal box 17 is closed by a suitable cover 17a. The compression member 12a and the tension portion 12b of the side frame 12 are connected intermediate the ends of the side frames by a pair of spaced columns 12c and 12d to form a double strut between the compression and tension members 12a and 12b respectively. Moreover, the spaced columns 12c and 12d form an opening or bolster window 18 therebetween, which is also defined by portions of members 12a and 12b, to receive therein one end of the bolster 13. The bolster window or opening 18 is narrower at the top than at the bottom whereby the bolster can readily be inserted in the wider lower portion thereof and then moved into the upper narrower portion to the position indicated in Fig. 1 of the drawing.

For the purpose of resiliently supporting each end of the bolster 13 within the corresponding bolster window 18 in side frames 12 there are provided spring clusters illustrated as a plurality of coil springs 19, two coil spring being illustrated as associated with each end of the bolster 13. Actually, it should be appreciated that more than two springs may be provided for each end of bolster 13 if desired and the number of springs employed is immaterial as far as the present invention is concerned. In order that these springs may remain in position the ends of the bolster 13 disposed within the bolster window 18 are suitably provided with integral spring-retaining portions 13a, one of which is clearly shown in Fig. 1 of the drawing. This will prevent the upper end of the coil springs 19 from moving relative to the bolster 13. In a similar manner the lower ends of the coil springs 19 are disposed within a suitable spring retainer plate 21. This retainer plate 21 is provided with peripheral flanges to maintain the lower ends of the springs in proper position. Moreover, this retainer plate 21 may be suitably supported on the side frame 12 and particularly on the horizontal portion 12b defining the lower side of the bolster window 18.

It will be appreciated that the coil springs 19 will provide some lateral resistance to relative lateral movement between the bolster 13 and the side frame 12.

It will be understood that if this lateral resistance furnished by the coil springs 19 is too large this may be undesirable. To this end, there is provided a plate 22 which is supported directly on the portion 12b of the side frame 12 which has a groove 23 defined therein to receive a corresponding rib 24 defined on the lower side of the spring retainer plate 21. The groove 23 and rib 24 have their longitudinal axes disposed in the same direction as the longitudinal axis of the track 11 whereby the rib 24 may readily rock in the groove 23 so that the lateral restraint or resistance of the coil springs 19 may not be undesirably great. The plate 22 is suitably fastened to the side frame 12 in any desired manner. It will be appreciated that the coil springs 19 can be inserted into the bolster window 18 in the conventional manner as by compressing the springs with a suitable means, not shown, and inserting them into place while the bolster 13 is raised into the upper portion of the bolster window 18. When the coil springs 19 are in position the means for compressing them is removed so that they support the bolster in the manner indicated in the drawing.

For the purpose of overcoming the disadvantages of prior art constructions set forth above there is provided in accordance with the present invention a pair of auxiliary or helper springs 25 one associated with each end of the bolster 13. The helper springs 25 are leaf springs of substantial length which are designed to operate in parallel with the coil springs 19. The coil springs 19 are intended to take the larger part of the bolster load, but the leaf springs 25 are designed to take a definite share of this load which can be predetermined by the natural curvature of the unloaded leaf springs and by the design of the means for supporting the leaf springs from the side frame 12. The load supported by the leaf springs 25 may, for example, be zero at light load or it may be ten or more percent of the total load at light load conditions. With increasing load, of course, the leaf springs 25 can be caused to take an increasing share of the load which can again be predetermined by proper design and dimension of the leaf springs and their supports.

To secure the leaf springs 25 to the bolster 13 each end of the bolster 13 is provided with a rectangular shaped box-like duct 26 open at each end, which duct extends transversely through the bolster end in a direction parallel with the longitudinal axes of the leaf springs 25 which, of course, are also parallel to the side frames 12. The side frames 12 are provided with openings 27 at either end through which the leaf springs 25 may be inserted. Furthermore, these side frames are hollow so that the leaf springs may extend within this hollow structure and through suitable openings 28 defined in the vertical members 12c and 12d. The duct 26 in each end of bolster 13 and the openings 28 in the associated side frame 12 must be in substantial alignment to permit ready insertion of the leaf springs 25 into the position shown in Fig. 1 of the drawing. As illustrated the leaf springs 25 are provided with the conventional spring bands 30. These spring bands 30 are so designed as to snugly fit within the bolster duct 26 and the leaf spring 25 is then rigidly secured to the bolster 13 by means of suitable dowel pins 31 which engage with the spring bands 30 and the bolster 13 respectively. Obviously any other means of fastening the leaf springs 25 to the bolster 13 may be employed so long as a relatively rigid connection between the two is provided.

To support the leaf springs 25 from the side frames 12 there are provided a pair of swing hangers 33 for each leaf spring 25. These swing hangers are hinged for pivotal movement about an axis parallel with the longitudinal axis of the side frame 12 specifically defined by the pins 34. Each side frame 12 is furthermore designed to have two pairs of spaced integral lugs 35 between each pair of which a swing hanger 33 is disposed and the pins 34 extend through the aligned lugs and swing hanger as clearly indicated in Fig. 1 of the drawing. The swing hangers 33 are furthermore hinged without any play in the longitudinal direction of the pins 34. There is sufficient space provided between the two pairs of lugs to accommodate the associated leaf spring 25, the ends of which are supported by the swing hangers 33.

In order to support the ends of the leaf springs 25 from the swing hangers 33 the lower ends of the swing hangers are provided with suitable pockets 36 which enclose the ends of the leaf spring 25. The vertical force transmitted by the spring 25 is taken up by the bottom 37 of the pocket 36 while the longitudinal forces transmitted by the leaf spring 25 are taken up by the lips 38 also defining the pocket 36. A small amount of longitudinal play must be provided between the ends of the leaf spring 25 and the lips 38 by virtue of the fact that the length of the leaf spring 25 varies somewhat in dependence upon the curvature thereof. In other words, the clearance between the lips 38 provided on the swing hangers 33 at either end of the leaf spring 25 must be such as to accommodate the leaf spring 25 when it is disposed in a horizontal position which is the longest condition that the leaf spring 25 will have. If it is bowed either upwardly or downwardly the length thereof will be shorter. The clearance that must be provided is relatively small in any event.

In accordance with the present invention the bottoms 37 of the pockets 36 are curved in a manner so that with increasing load on the leaf spring 25 the effective length of the spring between the supports at the ends thereof decreases which results in what is commonly termed as a convex spring charcteristic. This can best be understood by reference to Fig. 5 of the drawing where the curve A is a straight line curve representing the spring characteristic of the spring 19. The curve B, on the other hand, represents the convex spring characteristic of the leaf spring 25, and the curve C is the resulting curve of the combined springs 19 and 25. It will be appreciated that the curve C can be modified substantially in dependence upon where the zero point of the curve B is placed, in other words, the magnitude of the load when the spring 25 is first rendered effective. With this arrangement a much softer ride is provided at light loads without effecting substantially the load characteristics at full loads.

From the above description it will be apparent that the lateral and longitudinal forces are controlled in a very satisfactory manner with the arrangement of the present invention. Since the swing hangers 33 are restrained from moving longitudinally due to their playless suspension, and since the bolster 13 and the leaf spring 25 constitue due to their attachment by means of spring bands 30 and dowels 31 a quasi-rigid body the axles 14 and 15 will remain at right angles to the side frames so that misalignment is thereby eliminated. Preferably the clearance between the leafspring 25 and the lips 38 is less than the clearance between the bolster 13 and the side frames 12d and 12c defining the bolster window so that substantially shockless transmission of forces between the bolster and the side frames 12 result. Moreover, the wear which has heretofore been such a problem between the bolster and sides of the bolster window 18 is entirely avoided.

Due to the fact that the swing hanger suspension is provided the leaf springs 25 are permitted to swing sideways together with the bolster 13 to an extent that was not attainable in other designs. Furthermore, such side motion is very much controlled unlike the prior art arrangements where this motion was completely uncontrolled. It is restrained elastically first by the lateral deflection of the springs 19 which were present in prior arrangements but much more effectively by the torsional deflection of the leaf spring 25 which twists in one direction or the other in dependence upon the direction of the swing. Thus, the forces in the transverse direction as well as the longitudinal direction are completely controlled.

While there has been illustrated and described a particular embodiment of the present invention it will be understood that numerous changes and modifications will occur to those skilled in the art and it is intended in the appended claims to cover all such changes and modifications as fall within the true spirit and scope of the present invention.

What is claimed as new and desired to be secured by Letters Patent of the United States is:

1. In a railway car truck, the combination of a side frame having a bolster opening, a transversely disposed bolster extending into said opening, a leaf spring disposed lengthwise within the confines of said frame and extending transversely through said bolster, means for rigidly securing said bolster to said leaf spring intermediate the ends of said spring, and a pair of swing hangers mounted on a pivotal axis parallel with the longitudinal axis of said spring each supporting a different end of said leaf spring.

2. In a railway car truck, the combination of a side frame having a bolster opening, a transversely disposed bolster extending into said opening, coil spring means in said opening positioned between the bolster and said frame, a leaf spring disposed lengthwise within the confines of said frame and extending transversely through said bolster, means for rigidly securing said bolster to said leaf spring intermediate the ends of said spring, and a pair of swing hangers mounted on a pivotal axis parallel with the longitudinal axis of said spring each supporting a different end of said leaf spring.

3. In a railway car truck, the combination of a side frame having a bolster opening, a transversely disposed bolster extending into said opening, coil spring means in said opening positioned between the bolster and said frame, a leaf spring disposed lengthwise within the confines of said frame and extending transversely through said bolster, means for rigidly securing said bolster to said leaf spring intermediate the ends of said spring, a pair of swing hangers mounted on a pivotal axis parallel with the longitudinal axis of said spring each supporting a different end of said leaf spring, and means responsive to the load applied to said leaf spring by said bolster for varying the effective length of said leaf spring.

4. In trucks of the type which include a pair of wheel and axle units, a pair of side frames carried thereon, and a truck bolster extending laterally between the two side frames with the ends thereof disposed in bolster windows defined in said side frames; the combination of a coil spring for each end of said bolster for resiliently supporting said bolster from said side frames, a leaf spring rigidly secured to the end of said bolster and extending along the longitudinal axis of said side frame, and a pair of swing hangers for each leaf spring pivotally supported to said frame adjacent the ends of the leaf spring with the pivotal axis of said hangers parallel to said longitudinal axis.

5. In trucks of the type which include a pair of wheel and axle units, a pair of side frames carried thereon, and a truck bolster extending laterally between the two side frames with the ends thereof disposed in bolster windows defined in said side frames; the combination of a coil spring for each end of said bolster for resiliently supporting said bolster from said side frames, a leaf spring rigidly secured to the end of said bolster and extending along the longitudinal axis of said side frame, a pair of swing hangers for each leaf spring pivotally supported to said frame adjacent the ends of the leaf spring with the pivotal axis of said hangers parallel to said longitudinal axis, a pocket in each swing hanger for receiving an end of said leaf spring, and a lip on each of said hangers engageable by said leaf spring for transmitting longitudinal forces between said bolster and said leaf spring.

6. The arrangement of claim 5 wherein the bottom of said pocket is curved.

7. In a railway car truck, the combination of a side frame having a bolster opening, a transversely disposed bolster extending into said opening, coil spring means in said opening positioned between the bolster and means supported on said frame, a leaf spring disposed lengthwise within the confines of said frame and extending transversely through said bolster, dowel means for rigidly securing said bolster to said leaf spring intermediate the ends of said spring, a pair of swing hangers mounted on a pivotal axis parallel with the longitudinal axis of said leaf spring each supporting a different end of said leaf spring, and means responsive to the load applied to said leaf spring by said bolster for varying the effective length of said leaf spring, said leaf spring providing a torsional restraint to relative lateral movements between said side frame and said bolster.

References Cited in the file of this patent

UNITED STATES PATENTS

| | | |
|---|---|---|
| 1,458,673 | Adams | June 12, 1923 |
| 2,031,805 | Webb | Feb. 25, 1936 |
| 2,310,989 | Delkers | Feb. 16, 1943 |